US010959060B2

(12) United States Patent
Li et al.

(10) Patent No.: US 10,959,060 B2
(45) Date of Patent: Mar. 23, 2021

(54) METHOD AND APPARATUS FOR IMPLEMENTING MTC GROUP MESSAGE DELIVERY

(71) Applicant: Alcatel Lucent, Nozay (FR)

(72) Inventors: Xiangyang Li, Shanghai (CN); Yigang Cai, Naperville, IL (US)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/314,110

(22) PCT Filed: Jun. 20, 2017

(86) PCT No.: PCT/IB2017/000944
§ 371 (c)(1),
(2) Date: Dec. 28, 2018

(87) PCT Pub. No.: WO2018/002716
PCT Pub. Date: Jan. 4, 2018

(65) Prior Publication Data
US 2019/0222971 A1 Jul. 18, 2019

(30) Foreign Application Priority Data
Jun. 30, 2016 (CN) .......................... 201610506827.9

(51) Int. Cl.
*H04W 4/08* (2009.01)
*H04W 24/02* (2009.01)
(Continued)

(52) U.S. Cl.
CPC ............... *H04W 4/08* (2013.01); *H04W 4/70* (2018.02); *H04W 12/0027* (2019.01); *H04W 24/02* (2013.01)

(58) Field of Classification Search
CPC ..... H04M 15/12; H04M 15/725; H04W 4/08; H04W 12/08; H04W 12/00; H04W 4/005;
(Continued)

(56) References Cited

U.S. PATENT DOCUMENTS 10,225,698 B2 * 3/2019 Vaidya ................ H04W 64/003
10,382,925 B2 * 8/2019 Kim ....................... H04W 80/02
(Continued)

FOREIGN PATENT DOCUMENTS

CN 102014343 A 4/2011
CN 103716752 A 4/2014
(Continued)

OTHER PUBLICATIONS

International Search Report (PCT/ISA/210) for PCT International Application No. PCT/IB2017/000944 filed Jun. 20, 2017.
(Continued)

*Primary Examiner* — Khawar Iqbal
(74) *Attorney, Agent, or Firm* — Harness, Dickey & Pierce, P.L.C.

(57) ABSTRACT

A method and apparatus for implementing MTC group message delivery. The MTC-IWF obtains policy information from the PCRF and controls the delivery of the MTC group message according to the policy information by introducing the policy information of the MTC group message delivery in the PCRF. By introducing a flexible policy control mechanism, it can help the operators to define and customize various MTC group message delivery rules. With the increase in MTC ASes and MTC groups, operators can choose the network better, control the use of network resources, thereby achieving the purpose of improving or optimizing the network.

8 Claims, 2 Drawing Sheets

(51) Int. Cl.
*H04W 4/70* (2018.01)
*H04W 12/00* (2021.01)

(58) Field of Classification Search
CPC ......... H04W 4/24; H04W 4/70; H04W 24/02; H04W 4/00; H04L 29/08
See application file for complete search history.

(56) References Cited

U.S. PATENT DOCUMENTS

| | | | |
|---|---|---|---|
| 2014/0274186 A1* | 9/2014 | Cai | H04W 4/70 |
| | | | 455/517 |
| 2015/0050955 A1* | 2/2015 | Kim | H04W 4/08 |
| | | | 455/518 |
| 2015/0117347 A1* | 4/2015 | Iwai | H04W 72/087 |
| | | | 370/329 |
| 2016/0007138 A1* | 1/2016 | Palanisamy | H04L 67/1044 |
| | | | 455/41.2 |
| 2016/0330647 A1* | 11/2016 | Iwai | H04L 12/1407 |
| 2017/0150332 A1* | 5/2017 | Palanisamy | H04W 4/14 |
| 2017/0339534 A1* | 11/2017 | Bhalla | H04W 84/04 |
| 2018/0139797 A1* | 5/2018 | Chun | H04L 41/0681 |
| 2018/0279090 A1* | 9/2018 | Hirata | H04W 4/06 |
| 2019/0045343 A1* | 2/2019 | Palanisamy | H04W 4/70 |
| 2019/0327577 A1* | 10/2019 | Mohamed | H04L 67/12 |
| 2019/0342734 A1* | 11/2019 | Palanisamy | H04W 4/08 |
| 2019/0394201 A1* | 12/2019 | Zhang | H04W 4/08 |

FOREIGN PATENT DOCUMENTS

| | | |
|---|---|---|
| CN | 104662935 A | 5/2015 |
| CN | 106068674 A | 11/2016 |
| EP | 2693776 A1 | 2/2014 |
| JP | 2013/115677 A | 6/2013 |
| JP | 2016/513405 A | 5/2016 |
| WO | WO-2016/004301 | 1/2016 |
| WO | WO-2014/141575 | 2/2017 |

OTHER PUBLICATIONS

3rd Generation Partnership Project; Technical Specification Group Services and System Aspects; Architecture enhancementss to facilitate communications with packet data networks and applications (Release 14) dated Jun. 20, 2016. Internet URL http://www.3gpp.org/ftp/tsg_sa/WG2_Arch/Latest_SA2_Specs/Draft_INTERIM/.
Japanese Office Action dated Dec. 24, 2019 for corresponding Japanese Application No. 2018-568777.
Chinese Office Action dated Mar. 27, 2020 issued in corresponding Chinease Application No. 201610506827.9.
Chinese Office Action dated Nov. 4, 2020 issued in corresponding Chinese Appln. No. 201610506827.9.

* cited by examiner

METHOD AND APPARATUS FOR IMPLEMENTING MTC GROUP MESSAGE DELIVERY

CROSS-REFERENCE TO RELATED APPLICATIONS

This application is a national phase under 35 U.S.C. § 371 of PCT International Application No. PCT/IB2017/000944, which has an international filing date of Jun. 20, 2017, which claims priority Chinese Application No. 201610506827.9, filed Jun. 30, 2016.

FIELD OF THE INVENTION

The present disclosure relates to the field of communication technology, and more particularly to a technology for group message delivery.

BACKGROUND

Internet of Things (IoT), also known as MTC, is being widely used and developed rapidly. Due to the characteristics of a MTC device, almost most of the MTC message delivery is group-based message delivery. 3GPP's MTC (Machine Type Communication) solution defines a Group Message Delivery mechanism. Group message delivery refers to that a network with MTC capabilities, in response to SCS (Service Capability Server) or AS (Application Server) requirements, transmit the same content to a group of members within a particular geographical area.

At present, MTC group message delivery is mainly based on MBMS (Multimedia Broadcast Multicast Service), and 3GPP also defines a process of MBMS group message delivery based on MBMS.

However, there is no policy control in the current delivery mechanism of MTC group message. The operator or user cannot define a policy for MTC group message delivery and cannot control the delivery of a MTC group message, especially control the delivery of the MTC group message according to various information such as the requirements of different ASs, group characteristics, message types, network capabilities and load, UE capabilities or location or time, etc.

SUMMARY

An object of the present disclosure is to provide a method and apparatus for implementing MTC group message delivery.

According to a first aspect of the present disclosure, there is provided a method for controlling the delivery of a MTC group message in a MTC-IWF, wherein the method comprises: A. receiving a request message from a SCS, wherein the request message comprises a group identification, and the SCS requests to transmit a message to UEs within the group; B. transmitting a policy information request to a PCRF, which comprises the identification for the group and a request to the PCRF for a policy of message delivery of the group; C. receiving a reply for the policy information request from the PCRF, which comprises the policy for message delivery of the group; and D. controlling the message delivery of the group according to the policy.

Preferably, the policy for message delivery of the group comprises at least one rule corresponding to the group for controlling group message delivery, the rule comprising at least one of:

a white list corresponding to a certain time or region or content
a blacklist corresponding to a certain time or a region or content
a time limit for message delivery
a restriction for group size
a policy for UE reply
a routing path of the group message Preferably, the step D further comprises: transmitting an indication message to the SCS if the current time is not the time allowing message delivery, wherein the indication message comprises the time allowing message delivery; when the time allowing message delivery arrives, transmitting the message to UEs within the group in response to the request message from the SCS.

Preferably, the step D further comprises: if said policy comprises the restriction for group size and the number of current members of the group is greater than the maximum number allowed by the group, then dividing the group into a plurality of subgroups according to the maximum number allowed by the group and then transmitting the message to the plurality of subgroups respectively.

Preferably, the step D further comprises: transmitting the message to UEs within the group via a network element specified by the routing path if the policy comprises the routing path of the group message.

Preferably, the method further comprises: acquiring group data of the group from a HSS; the step D further comprising: controlling the message delivery of the group according to the policy and the group data of the group.

According to a second aspect of the present disclosure, there is provided an apparatus for controlling the delivery of a MTC group message in a MTC-IWF, wherein the apparatus comprises: a first receiving means configured to receive a request message from a SCS, wherein the request message comprises a group identification, and the SCS requests to transmit a message to UEs within the group; a first transmitting means configured to transmit a policy information request to a PCRF, which comprises the identification for the group and a request to the PCRF for a policy of message delivery of the group; a first receiving means configured to receive a reply for the policy information request from the PCRF, which comprises the policy for message delivery of the group; and a controlling means configured to control the message delivery of the group according to the policy.

Preferably, the policy for message delivery of the group comprises at least one rule corresponding to the group for controlling group message delivery, the rule comprising at least one of:

a white list corresponding to a certain time or region or content
a blacklist corresponding to a certain time or a region or content
a time limit for message delivery
a restriction for group size
a policy for UE reply
a routing path of the group message Preferably, the controlling means is further configured to: transmit an indication message to the SCS if the current time is not the time allowing message delivery, wherein the indication message comprises the time allowing message delivery; when the time allowing message delivery arrives, transmit the message to UEs within the group in response to the request message from the SCS.

Preferably, the controlling means is further configured to: divide the group into a plurality of subgroups according to the maximum number allowed by the group if said policy comprises the restriction for group size and the number of current members of the group is greater than the maximum number allowed by the group, and then transmit the message to the plurality of subgroups respectively.

Preferably, the controlling means is further configured to transmit the message to UEs within the group via a network element specified by the routing path if the policy comprises the routing path of the group message.

Preferably, the controlling means is further configured to: acquire group data of the group from a HSS; the step D further comprising: controlling the message delivery of the group according to the policy and the group data of the group.

Compared with the existing technologies for MTC group message delivery, the present disclosure proposes a policy control for MTC group message delivery. By introducing a flexible policy control mechanism, it can help the operators to define and customize various rules for MTC group message delivery. With the increase in MTC ASes and MTC groups, the operators can choose the network in a better way, control the use of network resources, thereby achieving the purpose of optimizing the network.

BRIEF DESCRIPTION OF THE DRAWINGS

Other features, objects and advantages of the present disclosure will become more apparent upon a reading of the following detailed description of non-limiting examples with reference to the accompanying drawings.

The same or similar reference numerals in the drawings represent the same or similar parts.

DETAILED DESCRIPTION

First of all, a few English abbreviations appeared in the description are explained:
AS: Application Server
HSS: Home Subscriber Server
MME: Mobility Management Entity
MSC: Mobile Switching Center
MTC-IWF: Machine Type Communications-InterWorking Function
SCS: Services Capability Server
SGSN: Serving GPRS Support Node
SMS-SC: Short Message Service-Service Center In order to solve the above-mentioned problems in the prior art, the present disclosure proposes that the PCRF is used to control the delivery of a MTC group message. A new Rx interface is added between the PCRF and the MTC-IWF. The MTC-IWF obtains a policy for MTC group message delivery from the PCRF through the newly added Rx interface, and then controls the delivery of the MTC group message according to the policy.

The disclosure will now be described in further detail with reference to the accompanying drawings.

Figure 1:
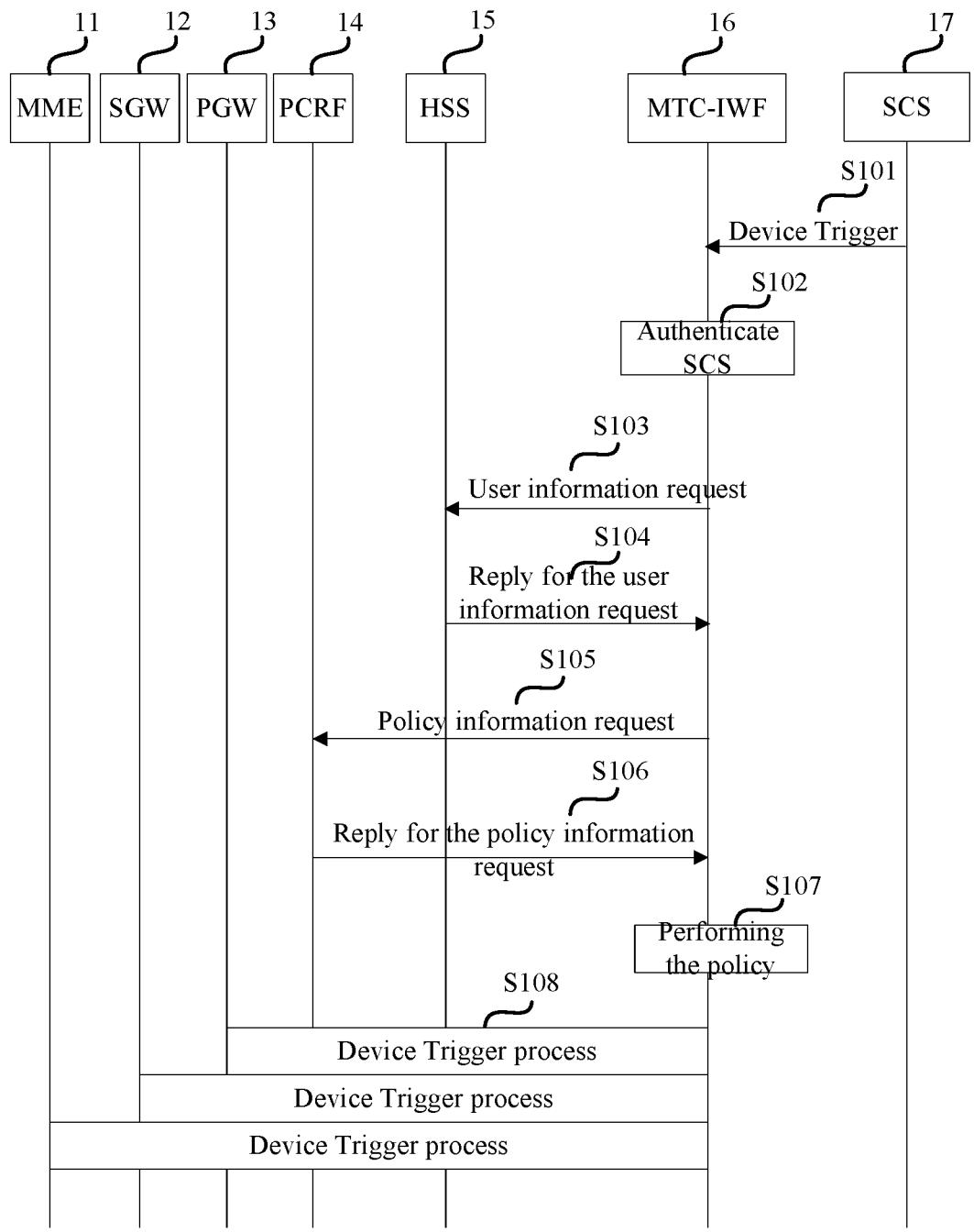
FIG. 1 shows a schematic diagram of a process for implementing MTC group message delivery according to an embodiment of the present disclosure.

FIG. 1 shows a schematic diagram of a process for implementing MTC group message delivery in accordance with an embodiment of the present disclosure. In this embodiment, MTC group 1 includes UE 11, UE 12, . . . , UE1n (not shown).

The process starts at step S101.

In step S101, the SCS 17 decides to transmit a group message to all members of the MTC group 1, and the SCS 17 transmits a request message to the MTC-IWF 16, such as a device trigger shown in FIG. 1, wherein the request message comprises the identification of the SCS 17 and the identification of the MTC group 1. The device trigger shown in FIG. 1 is merely exemplary and the present disclosure is also applicable to the delivery request of other group messages.

Next, in step S102, the MTC-IWF 16 determines whether the SCS 17 has the right to transmit a group message request.

If the MTC-IWF 16 determines that the SCS 17 has the right to transmit the group message, then the MTC-IWF 16 transmits a user information request to the HSS 15 in step S103, wherein the user information request comprises the identification of the SCS 17 and the identification of the MTC group 1 and is used to indicate the HSS 15 that SCS 17 requests to transmit a group message to all members of the MTC group 1. The user information request may be a Subscriber Information Request message.

Then, the HSS 15 retrieves, based on the received user information request, the group data corresponding to the MTC group 1, for example, the group basic information of the MTC group 1, the basic information of the group members of the MTC group 1, the location information or the roaming information, and the like.

Next, in step S104, the HSS 15 transmits a reply for the user information request to the MTC-IWF 16, which includes the above-mentioned group data corresponding to the MTC group 1 which comprises information on the group members of the MTC group 1 and the like. The reply for the user information request may be a Subscriber Information Answer message.

After receiving the reply for the user information request, the MTC-IWF 16 may know all the group members included in the MTC group 1, and then, in step S105, the MTC-IWF 16 transmits a policy information request to the PCRF 14, which comprises the identification of the MTC group 1 and a request to the PCRF 14 for a policy of message delivery of the MTC group 1.

The PCRF 14 pre-stores policy information related to the MTC group message, wherein the policy information may be pre-configured by the operator and includes at least the MTC group identification and rules corresponding to the MTC group. These rules may be, but not limited to, one or more of:
 a white list corresponding to a certain time or region or content. That is, the MTC group message is sent only to the UE on the white list at the certain time; or the MTC group message is sent only to the UE on the white list in the certain region; or for the certain content, the MTC group message is only sent to the UE on the white list.
 a blacklist corresponding to a certain time or a region or content. That is, the MTC group message cannot be sent to the UE on the blacklist in the certain time; or the MTC group message cannot be sent to the UE on the blacklist in the certain region; or for the certain content, the MTC group message cannot be sent to the UE on the blacklist.
 a time limit for message delivery. For example, messages can only be sent at a specific time period to mitigate network congestion.
 a restriction for group size. It refers to the maximum number of UEs allowed by a group. In this way, it can prevent excessive messages generated by a larger group from increasing the load on network processing. If the policy comprises the restriction for group size and the number of current members of the group is greater than the maximum number allowed by the group, then MTC-IWF may divide the group into a plurality of subgroups according to the maximum number and then transmit the group message to the plurality of subgroups respectively.

a policy for UE reply, which refers to whether the UE reply is required, if the UE reply is required, the time allowing relay.

a routing path of the group message. It refers to the group message is sent by which network element: MME or SMSC or PGW or other network element. By specifying the routing path, the purpose of optimizing the path and reducing the network load can be achieved.

a relay mode of the group message. It refers to whether the message is relayed through the GW or the primary UE.

After receiving the policy information request sent by the MTC-IWF 16, the PCRF 14 retrieves the policy information corresponding to the group according to the identification of the MTC group 1, and then transmits the policy information to the MTC-IWF 16.

In step S106, the PCRF 14 transmits a reply for the policy information request to the MTC-IWF 16, which comprises a policy for the group message delivery of the MTC group 1.

Then, in step S107, the MTC-IWF 16 controls the delivery of the group message of the MTC group 1 according to the received policy. The MTC-IWF 16 controls the delivery of the message of the group members in the MTC group 1 in accordance with a rule in the policy information and taking into account the current conditions, that is, triggering the device trigger process of each member in the MTC group 1 in turn. Herein and the subsequent processes as shown in step S108 belong to the prior art, and will not be described here.

In an embodiment, the policy information includes information of the time limit for message delivery. If the current time is not the time allowing message delivery, the MTC-IWF16 transmits an indication message to the SCS 17 which comprises the time allowing message delivery. Upon receipt of the above-mentioned indication message, the SCS 17 will transmit the request message to the MTC-IWF 16 again when the time allowing message delivery arrives. At this time, the MTC-IWF 16 may transmit a group message to the member UEs in the MTC group 1.

In yet another embodiment, the policy information includes information of the restriction for group size. If the policy comprises the restriction for group size and the number of current members of the MTC group 1 is greater than the maximum number allowed by the group, then the MTC-IWF16 may divide the group into a plurality of subgroups according to the maximum number and then transmit the group message to the plurality of subgroups respectively In yet another embodiment, the policy information includes information of the routing path of the group message. If the policy comprises the routing path of the group message, the MTC-IWF 16 transmits the message to UEs within the MTC group 1 via a network element specified by the routing path.

In yet another embodiment, the MTC-IWF 16 may further combine the received policy information with the group data of the MTC group 1 obtained from the HSS 15 to control the message delivery of the group members in the MTC group 1. For example, the MTC-IWF 16 obtains the basic information or the location information or the roaming information of the group members from the HSS 15 in step S104, and sometimes this information is used to define the delivery rule of the group message.

Figure 2:
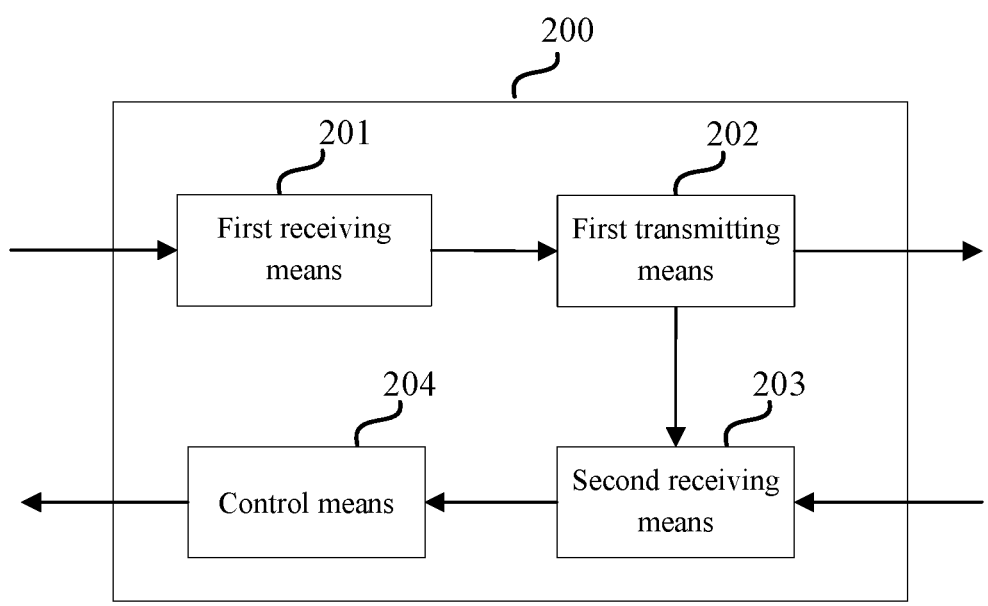
FIG. 2 shows a schematic diagram of a device for implementing MTC group message delivery in the MTC-IWF according to an embodiment of the present disclosure.

FIG. 2 shows a schematic diagram of an apparatus for implementing MTC group message delivery in the MTC-IWF 16 according to an embodiment of the present disclosure. The apparatus 200 includes a first receiving means 201, a first transmitting means 202, a second receiving means 203, and a control means 204.

In this embodiment, the MTC group 1 includes UE 11, UE 12, . . . , UE1n (not shown).

The operations of the apparatus 200 will be described in detail below with reference to FIG. 1.

First, the first receiving means 201 receives a request message from the SCS 17, such as the device trigger shown in FIG. 1, wherein the request message comprises the identification of the SCS 17 and the identification of the MTC group 1, and the SCS 17 requests to transmit a group message to all members of the MTC group 1. The device trigger shown in FIG. 1 is merely exemplary and the present disclosure is also applicable to the delivery request of other group messages.

Next, the MTC-IWF 16 determines whether the SCS 17 has a right to transmit a group message request.

If the MTC-IWF 16 determines that the SCS 17 has the right to transmit the group message, the MTC-IWF 16 then transmits a user information request to the HSS 15, wherein the user information request comprises the identification of the SCS 17 and the identification of the MTC group 1 and is used to indicate to the HSS 15 that SCS 17 requests to transmit the group message to all members of the MTC group 1. The user information request may be a Subscriber Information Request message.

Then, the MTC-IWF 16 receives a reply for the user information request from the HSS 15, which includes the above-mentioned group data corresponding to the MTC group 1 which comprises information on the group members of the MTC group 1 and the like. The reply for the user information request may be a Subscriber Information Answer message.

After receiving the reply for the user information request, the MTC-IWF 16 may know all the group members included in the MTC group 1, and then the first transmitting means 202 transmits a policy information request to the PCRF 14, which comprises the identification of the MTC group 1 and a request to the PCRF 14 for a policy of message delivery of the MTC group 1.

The PCRF 14 pre-stores policy information related to the MTC group message, wherein the policy information may be pre-configured by the operator and includes at least the MTC group identification and rules corresponding to the MTC group. These rules may be, but not limited to, one or more of:

a white list corresponding to a certain time or region or content. That is, the MTC group message is sent only to the UE on the white list at the certain time; or the MTC group message is sent only to the UE on the white list in the certain region; or for the certain content, the MTC group message is only sent to the UE on the white list.

a blacklist corresponding to a certain time or a region or content. That is, MTC group message cannot be sent to the UE on the blacklist in the certain time; or MTC group message cannot be sent to the UE on the blacklist in the certain region; or for a certain content, MTC group message cannot be sent to the UE on the blacklist.

a time limit for message delivery. For example, messages can only be sent at a specific time period to mitigate network congestion.

a restriction for group size. It refers to the maximum number of UEs allowed by a group. In this way, it can prevent excessive messages generated by a larger group from increasing the load on network processing. If the policy comprises the restriction for group size and the number of current members of the group is greater than the maximum number allowed by the group, then MTC-IWF may divide the group into a plurality of subgroups according to the maximum number and then transmit the group message to the plurality of subgroups respectively.

a policy for UE reply, which refers to whether the UE reply is required, if the UE reply is required, the time allowing relay.

a routing path of the group message. It refers to the group message is sent by which network element: MME or SMSC or PGW or other network element. By specifying the routing path, the purpose of optimizing the path and reducing the network load can be achieved.

a relay mode of the group message. It refers to whether the message is relayed through the GW or the primary UE.

After receiving the policy information request sent by the MTC-IWF 16, the PCRF 14 retrieves the policy information corresponding to the group according to the identification of the MTC group 1, and then transmits the policy information to the MTC-IWF 16.

The second receiving means 203 receives from the PCRF 14 a reply for the policy information request, which comprises a policy for the group message delivery of the MTC group 1.

Then, the control means 204 controls the delivery of the group message of the MTC group 1 according to the received policy. The control means 204 controls the delivery of the message of the group members in the MTC group 1 in accordance with a rule in the policy information and taking into account the current conditions, that is, triggering the device trigger process of each member in the MTC group 1 in turn. Herein and the subsequent processes belong to the prior art, and will not be described here.

In one embodiment, the policy information includes information of the time limit for message delivery. If the current time is not the time allowing message delivery, the control means 204 transmits an indication message to the SCS 17 which comprises the time allowing message delivery. Upon receipt of the above-mentioned indication message, the SCS 17 will transmit the request message to the MTC-IWF 16 again when the time allowing message delivery arrives. At this time, the control means 204 transmits a group message to the member UEs in the MTC group 1.

In yet another embodiment, the policy information includes information of the restriction for group size. If the policy comprises the restriction for group size and the number of current members of the MTC group 1 is greater than the maximum number allowed by the group, then the control means 204 may divide the group into a plurality of subgroups according to the maximum number allowed by the group and then transmit the group message to the plurality of subgroups respectively In yet another embodiment, the policy information includes information of the routing path of the group message. If the policy comprises the routing path of the group message, the control means 204 transmits a message to the UEs within the MTC group 1 via a network element specified by the routing path.

In yet another embodiment, the control means 204 may further combine the received policy information with the group data of the MTC group 1 obtained from the HSS 15 to control the message delivery of the group members in the MTC group 1. For example, the control means 204 obtains the basic information or the location information or the roaming information of the group members from the HSS 15, and sometimes this information is used to define the delivery rule of the group message.

It is noted that the present disclosure may be implemented in software and/or software and hardware combinations, for example, by means of an application specific integrated circuit (ASIC), a general purpose computer, or any other similar hardware device. In one embodiment, the software program of the present disclosure may be executed by a processor to implement the steps or functions described above. Likewise, the software program (including the associated data structure) of the present disclosure may be stored in a computer readable recording medium, such as a RAM memory, a magnetic or optical drive or a floppy disk and the like. In addition, some of the steps or functions of the present disclosure may be implemented in hardware, for example, as a circuit for cooperating with a processor to perform various steps or functions.

In addition, a portion of the present disclosure may be applied as a computer program product, such as a computer program instruction, which may invoke or provide the method and/or technical scheme according to the present disclosure when it is executed by a computer. The program instructions that invoke the method of the present disclosure may be stored in a fixed or removable recording medium and/or transmitted through a data stream in a broadcast or other signaling bearer medium and/or stored in a working memory of the computer device which is run according to the program instructions. There is provided an apparatus in accordance with one embodiment of the present disclosure, which comprise a memory for storing computer program instructions and a processor for executing the program instructions, wherein when the computer program instructions are executed by the processor, the apparatus is caused to operates based on the foregoing methods and/or technical solutions according to embodiments of the present disclosure.

It will be apparent to those skilled in the art that the present disclosure is not limited to the details of the above-described exemplary embodiments, and that the disclosure may be practiced in other specific forms without departing from the spirit or essential characteristics thereof. Accordingly, the disclosure is to be considered in all respects as illustrative and not restrictive, and the scope of the disclosure is defined by the appended claims rather than by the foregoing description, and is therefore intended to embrace all changes within the scope of the appended claims. Any reference signs in the claims should not be construed as limiting the claims. In addition, it is clear that the term "including" does not exclude other units or steps, and the singular does not exclude the plural. The plurality of elements or devices described in the device claims may also be implemented by software or hardware by a unit or device. First, second and other words used to express the name, and do not indicate any particular order.

What is claimed is:

1. A method for controlling delivery of a machine type communication (MTC) group message in an MTC interworking function (MTC-IWF), wherein the method comprises:
   receiving a request message from a services capability server (SCS), wherein the request message includes a group identification, and the SCS requests to transmit a message to user equipments (UEs) within the group;
   transmitting a policy information request to a policy and charging rules function (PCRF), which includes the identification for the group and a request to the PCRF for a policy that defines at least one restriction for message delivery of the group;
   receiving a reply for the policy information request from the PCRF, the reply including the at least one restriction for message delivery of the group, the at least one restriction including a relay mode of the group message indicating whether the group message is relayed through a gateway or a primary UE;
   based on the policy including the at least one restriction permitting message delivery to the group,
      sending, to a home subscriber server, a user information request that includes the identification of the group and an identification of the SCS,
      receiving, from the home subscriber server, group data that identifies members of the group based on the identification of the SCS, and
      controlling the message delivery to the members of the group according to the at least one restriction for message delivery defined by the policy,
      wherein the message delivery includes delivery of device triggers and of group messages other than device triggers; and
   transmitting the message to UEs within the group via a network element specified by a routing path included in the policy.

2. The method according to claim 1, wherein the at least one restriction includes,
   a white list restriction corresponding to a certain time or region or content,
   a blacklist restriction corresponding to a certain time or a region or content,
   a time limit restriction for message delivery,
   a restriction for group size, and/or
   a restriction for user equipment (UE) reply.

3. The method according to claim 1, wherein the controlling the message delivery includes,
   transmitting an indication message to the SCS if a current time is not a time allowing message delivery, the indication message including the time allowing message delivery, and
   when the time allowing message delivery arrives, transmitting the message to UEs within the group in response to the request message from the SCS.

4. The method according to claim 1, wherein the controlling the message delivery includes,
   if said policy includes the restriction for group size and a number of current members of the group is greater than the maximum number allowed by the group, dividing the group into a plurality of subgroups according to the maximum number allowed by the group and then transmitting the message to the plurality of subgroups respectively.

5. An apparatus for controlling delivery of a machine type communication (MTC) group message in an MTC interworking function (MTC-IWF), wherein the apparatus comprises:
   a first receiving means configured to receive a request message from a services capability server (SCS), the request message including a group identification, and the SCS requests to transmit a message to user equipments (UEs) within the group;
   a first transmitting means configured to transmit a policy information request to a policy and charging rules function (PCRF), which includes the identification for the group and a request to the PCRF for a policy that defines at least one restriction for message delivery of the group, the at least one restriction including a relay mode of the group message indicating whether the group message is relayed through a gateway or a primary UE;
   a first receiving means configured to receive a reply for the policy information request from the PCRF, the reply including the at least one restriction for message delivery of the group; and
   a controlling means configured to, based on the policy including the at least one restriction permitting message delivery to the group,
      send, to a home subscriber server, a user information request that includes the identification of the group and an identification of the SCS,
      receive, from the home subscriber server, group data that identifies members of the group based on the identification of the SCS,
      control the message delivery to the members of the group according to the policy, and
      transmit the message to UEs within the group via a network element specified by a routing path included in the policy,
      wherein the message delivery includes delivery of device triggers and of group messages other than device triggers.

6. The apparatus according to claim 5, wherein the at least one restriction includes,
   a white list restriction corresponding to a certain time or region or content,
   a blacklist restriction corresponding to a certain time or a region or content,
   a time limit restriction for message delivery,
   a restriction for group size, and/or
   a restriction for user equipment (UE) reply.

7. The apparatus according to claim 5, wherein the controlling means is further configured to,
   transmit an indication message to the SCS if a current time is not a time allowing message delivery, the indication message including the time allowing message delivery, and
   when the time allowing message delivery arrives, transmit the message to UEs within the group in response to the request message from the SCS.

8. The apparatus according to claim 5, wherein the controlling means is further configured to,
   divide the group into a plurality of subgroups according to a maximum number allowed by the group if said policy includes the restriction for group size and a number of current members of the group is greater than the maximum number allowed by the group, and
   transmit the message to the plurality of subgroups respectively.

* * * * *